US006504698B1

(12) United States Patent
Durif et al.

(10) Patent No.: US 6,504,698 B1
(45) Date of Patent: Jan. 7, 2003

(54) STANDARD CONTROL DEVICE OF A CIRCUIT BREAKER OPENING OR CLOSING ELECTROMAGNET

(75) Inventors: Ghislain Durif, Meylan (FR); Jean-Pierre Nereau, Seyssinet-Pariset (FR); Mustapha Chelloug, Echirolles (FR)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/447,734

(22) Filed: Nov. 23, 1999

(30) Foreign Application Priority Data

Dec. 15, 1998 (FR) ........................................ 98 15552

(51) Int. Cl.[7] ........................................ H01H 47/00

(52) U.S. Cl. ........................ 361/152; 361/154; 361/160

(58) Field of Search ................................ 361/152, 115, 361/160, 154, 187

(56) References Cited

U.S. PATENT DOCUMENTS 5,450,276 A * 9/1995 Olifant et al. .............. 361/152
5,671,115 A 9/1997 Streich ....................... 361/187

* cited by examiner

*Primary Examiner*—Stephen W. Jackson
(74) *Attorney, Agent, or Firm*—Roger W. Parkhurst; Larry I. Golden

(57) ABSTRACT

The device compares a voltage representative of the supply voltage of the electromagnet with two distinct inrush thresholds and a drop-out threshold. As soon as this voltage reaches one of the inrush thresholds, the device commands switching to an inrush phase of preset duration. The first inrush threshold is representative of a voltage of about 40 to 50% of the rated supply voltage of the electromagnet, whereas the second inrush threshold is representative of 70 to 85% of this voltage. The same control device can thus be used with both an under-voltage release and a shunt release or for a circuit breaker closing electromagnet.

10 Claims, 8 Drawing Sheets

12
U1
15
11
13
Ua
R2
R3
U2
µP
14
E1
E2
E3
Ib
S1
S2
D1
T1
R1

STANDARD CONTROL DEVICE OF A CIRCUIT BREAKER OPENING OR CLOSING ELECTROMAGNET

BACKGROUND OF THE INVENTION

The invention relates to a control device of a circuit breaker opening or closing electromagnet, said device comprising at least one coil connected in series with an electronic switch to the terminals of a supply voltage, means for measuring a first voltage, representative of the supply voltage, and means for control of the electromagnet, comprising means for comparison, connected to the means for measuring the first voltage and to a control electrode of the electronic switch, to compare the first voltage with inrush and drop-out thresholds.

Circuit breakers generally comprise a certain number of electrical auxiliaries, more particularly closing electromagnets (XF) or opening electromagnets, notably shunt releases (MX) or under-voltage releases (MN). The electromagnets used in under-voltage releases (MN) have different operating characteristics from those used in shunt releases (MX) or in closing electromagnets (XF). The control devices which are associated thereto are consequently different.

SUMMARY OF THE INVENTION

The object of the invention is to achieve a standard control device able to be used indifferently with the three above-mentioned types of auxiliaries and guaranteeing a satisfactory operating safety in all cases.

According to the invention this object is achieved by the fact that the means for comparison compare the first voltage with distinct first and second inrush thresholds and with a drop-out threshold, so as to monitor the flow of an inrush current in the coil during an inrush phase of preset duration when the first voltage reaches one of the inrush thresholds.

According to a development of the invention, at the end of an inrush phase the control means control, during a holding phase, the flow in the coil of a holding current weaker than the inrush current, the device comprising means for measuring the current flowing in the coil, the control means comprising means for regulating the holding current, with means for comparing the current with a preset setpoint value, and means for commanding switching to a new inrush phase when, during a holding phase, the current is less than or equal to a preset fraction of the setpoint value during a second preset duration.

According to another development of the invention, the means for measuring the first voltage comprise numerical means for determining the rms voltage, comprising sampling means and a finite impulse response filter having an equation of the form:

$$U2=a_1A1+a_2A2+ \cdots +a_jA_j+ \cdots +a_nAn$$

$$\text{with } Aj = \sum_{0}^{m-1} U2_i^2$$

where $U2_i$ is a sample of the first voltage, $n \geqq 2$, $m \geqq 1$, the weighting coefficients $a_j$ not all being identical.

BRIEF DESCRIPTION OF THE DRAWINGS

Other advantages and features will become more clearly apparent from the following description of particular embodiments given as non-restrictive examples only and represented in the accompanying drawings in which.

DETAILED DESCRIPTION OF THE PREFERRED EMBODIMENT

An electromagnet conventionally comprises a movable core, movement of which to a position in which the electromagnet is actuated is caused by flow of an inrush current. It is then held in this position by the flow of a weaker, holding current.

Figure 1:
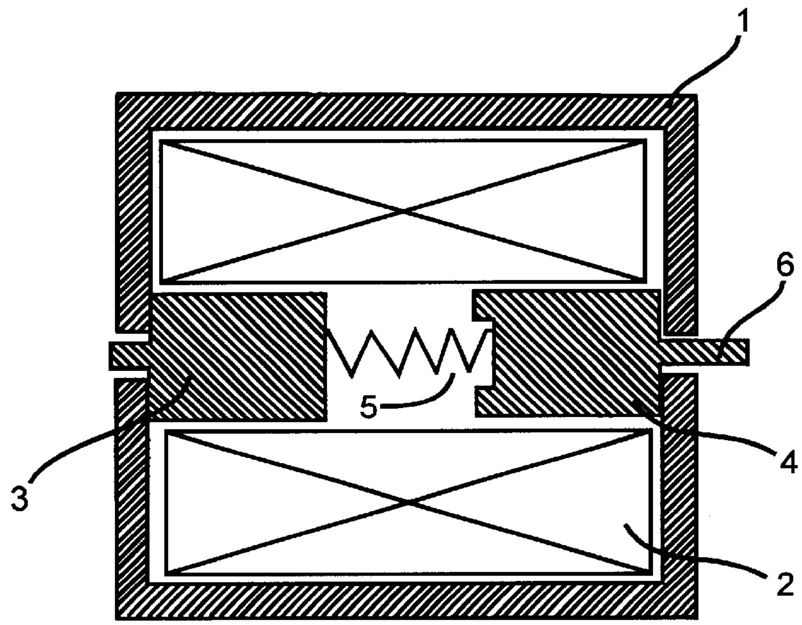
FIGS. 1 and 2 represent schematically, in cross-section, particular embodiments, of known type, of electromagnets used for an under-voltage release (MN) and, respectively, in a shunt release (MX) or for a closing electromagnet of a circuit breaker.

An electromagnet of the type represented in FIG. 1 is, conventionally, used in under-voltage releases (MN). It comprises an armature 1 inside which a coil 2 is arranged. The coil 2 surrounds a fixed core 3, secured to the armature 1, and a movable core 4. A spring 5 is fitted between the fixed core and the movable core so as to separate the movable core 4 from the fixed core 3. In the rest position of the electromagnet, represented in FIG. 1, a plunger 6 securedly affixed to the movable core 4 protrudes out from the armature. Application of a supply voltage to the terminals of the coil 1 causes excitation of the electromagnet. Flow of an inrush current in the coil 1 causes movement of the movable core 4 in the direction of the fixed core 3, against the spring 5. When the cores come into contact, the plunger 6 no longer protrudes out from the armature 1. The inrush phase lasts sufficiently long to enable a complete movement of the movable core 4 which comes into contact with the fixed core 3. Subsequently, flow of a high inrush current is no longer necessary to hold the movable core in the actuation position of the electromagnet and, conventionally, only a weaker holding current is maintained in the coil 1. When the supply voltage is insufficient, the current flow in the coil 1 is interrupted. The energy of the spring 5 then urges the movable core 4 to the position represented in FIG. 1 and the plunger 6, securedly affixed to the movable core, causes opening of the associated circuit breaker in the case of an under-voltage release. Opening of the circuit breaker being performed by the action of the spring 5, the latter must be relatively powerful. Consequently, the energy required to bring the cores into contact when excitation of the electromagnet takes place, thus allowing closing of the circuit breaker, is relatively high. The supply voltage of the electromagnet must consequently be sufficient to ensure that the cores come into contact in all cases when an electromagnet command is performed. Conventionally, for an under-voltage release coil having a rated voltage A of 100V, an inrush threshold of about 70V and a drop-out threshold of about 30V are used.

Figure 2:
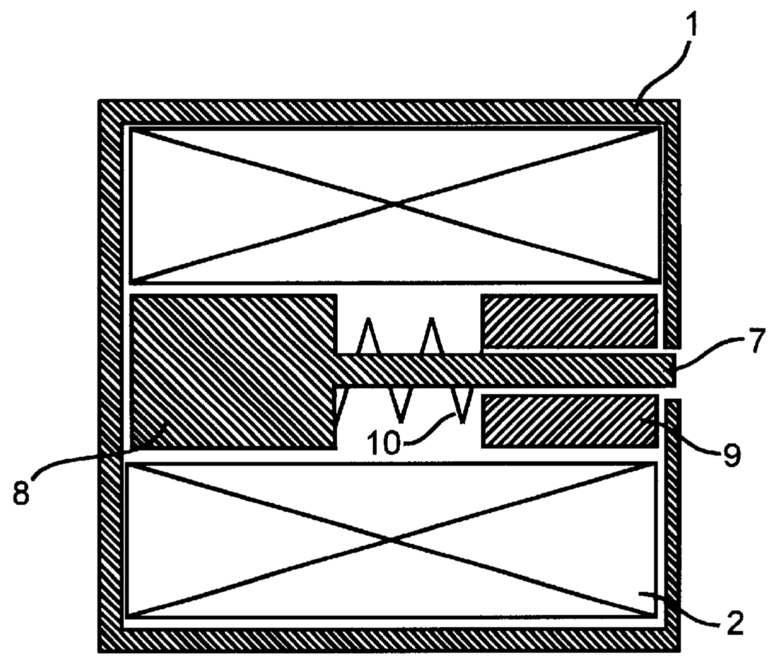

An electromagnet of the type represented in FIG. 2 is, conventionally, used in shunt releases (MX) and as closing electromagnet (XF) of a circuit breaker. It also comprises a coil 2 in an armature 1. A plunger 7 securedly affixed to a movable core 8 passes through a fixed core 9, secured to the armature 1. In the rest position of the electromagnet, represented in FIG. 2, a spring 10 keeps the cores separated from one another, the plunger then not protruding outside the armature. In case of actuation of the electromagnet an inrush current flowing in the coil 2 causes movement of the movable core, and consequently of the plunger 7, which then protrudes outwards, thus allowing either opening of the associated circuit breaker in the case of a shunt release (MX) or closing thereof in the case of a closing electromagnet (XF). It is therefore the electromagnetic energy supplied by the coil which causes actuation of the circuit breaker. As previously, an inrush phase is followed by a holding phase, during which the current flowing in the coil is weaker. When the voltage is lower than a drop-out threshold, the current flow in the coil is interrupted and the movable core 8 is moved away from the fixed core 9 by the action of the spring 10. Switching to this position not having any action on the circuit breaker, the spring 10 does not have to be powerful. It is therefore a relatively weak spring in comparison with the spring 5. The supply voltage necessary for actuation of the electromagnet is consequently less than that necessary in the case of an electromagnet according to FIG. 1. Conventionally, for a coil of a shunt release having a rated supply voltage A of 100V, an inrush threshold of about 20V and a drop-out threshold of about 10V are used.

Figure 3:
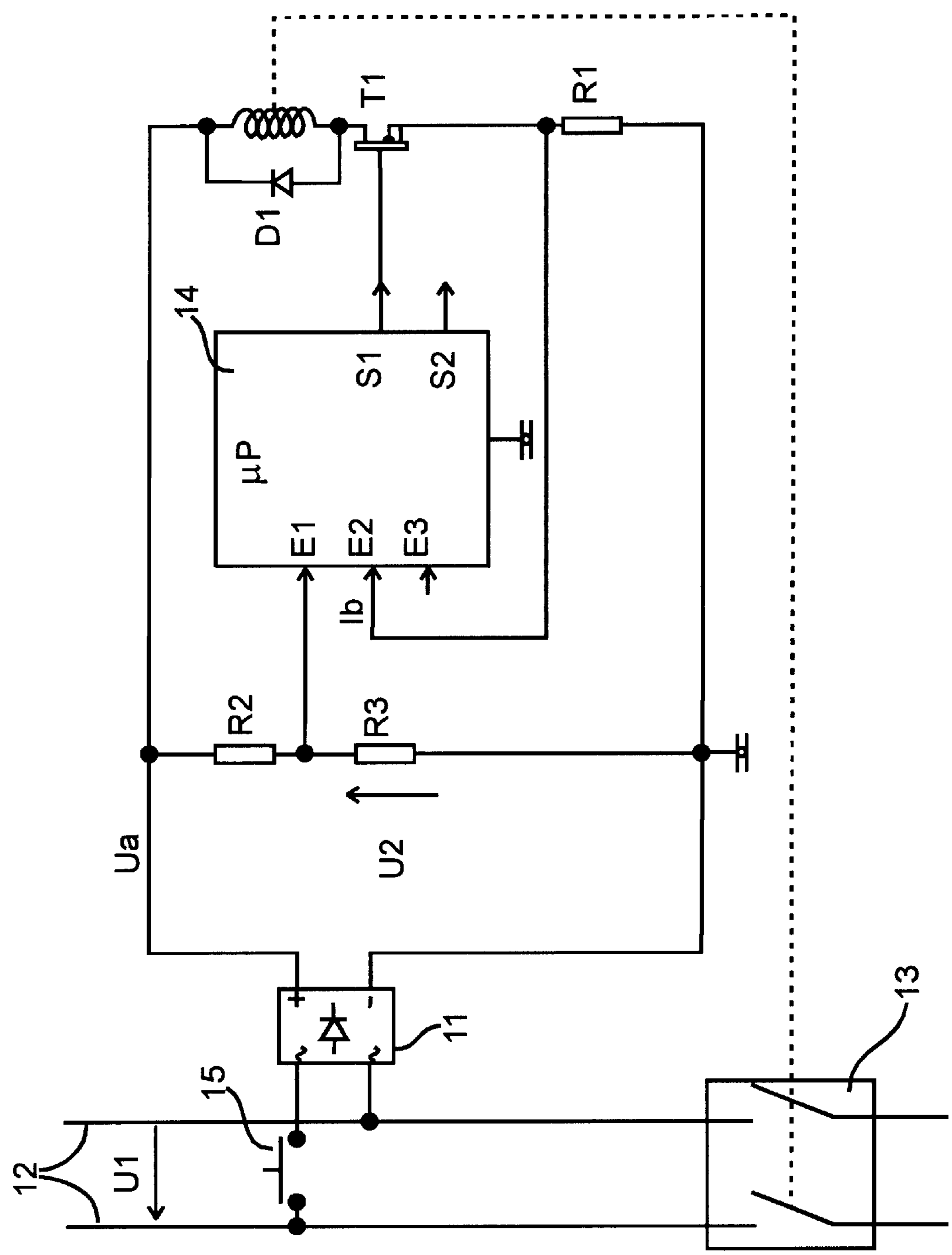
FIG. 3 illustrates a control device in which the invention can be implemented.

The control device illustrated in FIG. 3 can be used either for control of an electromagnet according to FIG. 1 for an under-voltage release or for control of an electromagnet according to FIG. 2 for a shunt release or a closing electromagnet of a circuit breaker.

The coil 2 is connected in series with an electronic switch, preferably formed by a transistor T1, and a measuring resistor R1 to the terminals of a supply voltage Ua. Conventionally, a free-wheel diode D1 is connected in parallel with the coil 2. The supply voltage Ua is obtained by rectification, by means of a diode bridge rectifier 11, of an AC voltage U1 supplied by the conductors of a power system 12 to which a circuit breaker is connected, opening or, should this be the case, closing of which circuit breaker can be controlled by the coil 2. An output S1 of a control circuit 14, preferably a microprocessor-based circuit, is connected to a control electrode of the transistor T1 to which it supplies control signals. An input E1 of the control circuit 14 is connected to the mid-point of a resistive divider formed by two resistors R2 and R3, connected in series to the terminals of the supply voltage Ua. The signals applied to the input E1 are representative of the voltage U2 at the terminals of the resistor R3, itself representative of the supply voltage Ua of the electromagnet, which is itself representative of the voltage U1 of the power system 12. The control circuit 14 is also connected to the terminals of the resistor R1, so as to receive on an input E2 signals Ib representative of the current flowing in the coil when the transistor T1 is turned on. In the case of a shunt release (MX) or of a circuit breaker closing electromagnet (XF), a control means enables a control order to be supplied to the electromagnet. The electromagnet is actuated on receipt of this order provided that the supply voltage Ua is sufficient. In FIG. 3, the control means is formed by a pushbutton 15 arranged between one of the power system conductors and one of the input terminals of the rectifier 11. The control means may apply a control order directly to a control input, not represented, of the microprocessorbased control circuit 14. In this case, as in the case of an under-voltage release (MN), the rectifier 11 is permanently connected to the power system 12.

Figure 4:
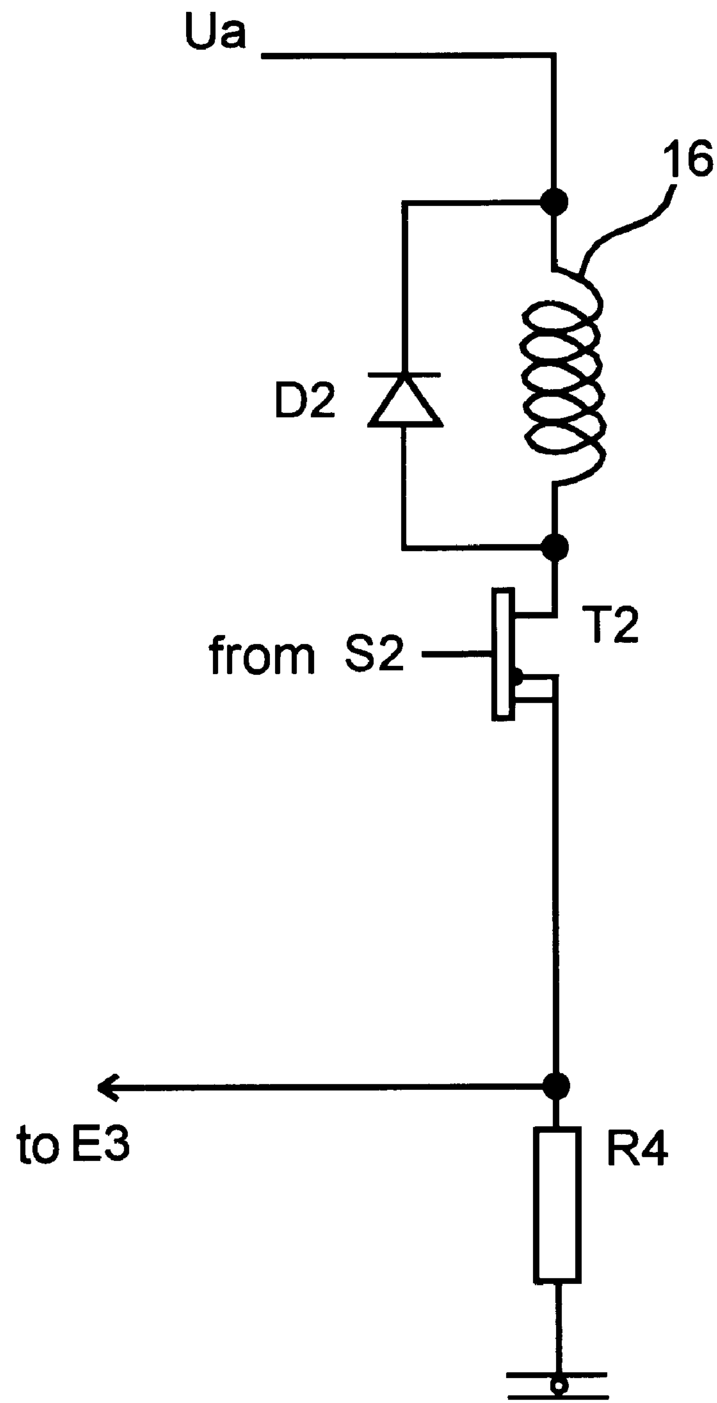
FIG. 4 illustrates the additional elements of a device according to FIG. 3 in the case of an electromagnet with double coil.

FIG. 4 illustrates the complementary elements of an embodiment with double coil. An inrush coil 16 is connected in series with a transistor T2 and a measuring resistor R4 to the terminals of the supply voltage Ua. A free-wheel diode D2 is connected in parallel with the inrush coil 16. The control electrode of the transistor T2 is connected to an output S2 of the control circuit 14. If the current in the inrush coil 16 has to be regulated during the inrush phase, the point common to R4 and T2 is connected to an input E3 of the circuit 14.

The control circuit 14 can be achieved by any suitable, analog or digital, means. In a preferred embodiment, it comprises a microprocessor which performs sampling, with a sampling period Te, of the signals applied to its inputs E1, E2 and E3, analog-to-digital conversion of these signals, comparison of these signals with setpoint values during the holding and inrush phases, and control of the transistors T1 and T2.

The control circuit 14 of a device according to the invention uses two distinct inrush thresholds and a drop-out threshold. It can thus be used indifferently with the different types of electromagnets. The inrush and drop-out thresholds selected are compatible both with existing electromagnets and with the norms of the circuit breaker auxiliaries involved.

A particular embodiment of a flowchart of operation of a microprocessor-based device according to the invention, represented in FIG. 5, will be explained in greater detail hereafter, with reference to the wave shapes of the signals U2 and Ib, represented in FIGS. 7*a* and 7*b* in which the voltage U2 increases slowly up to its rated value U2*n*.

Figure 5:
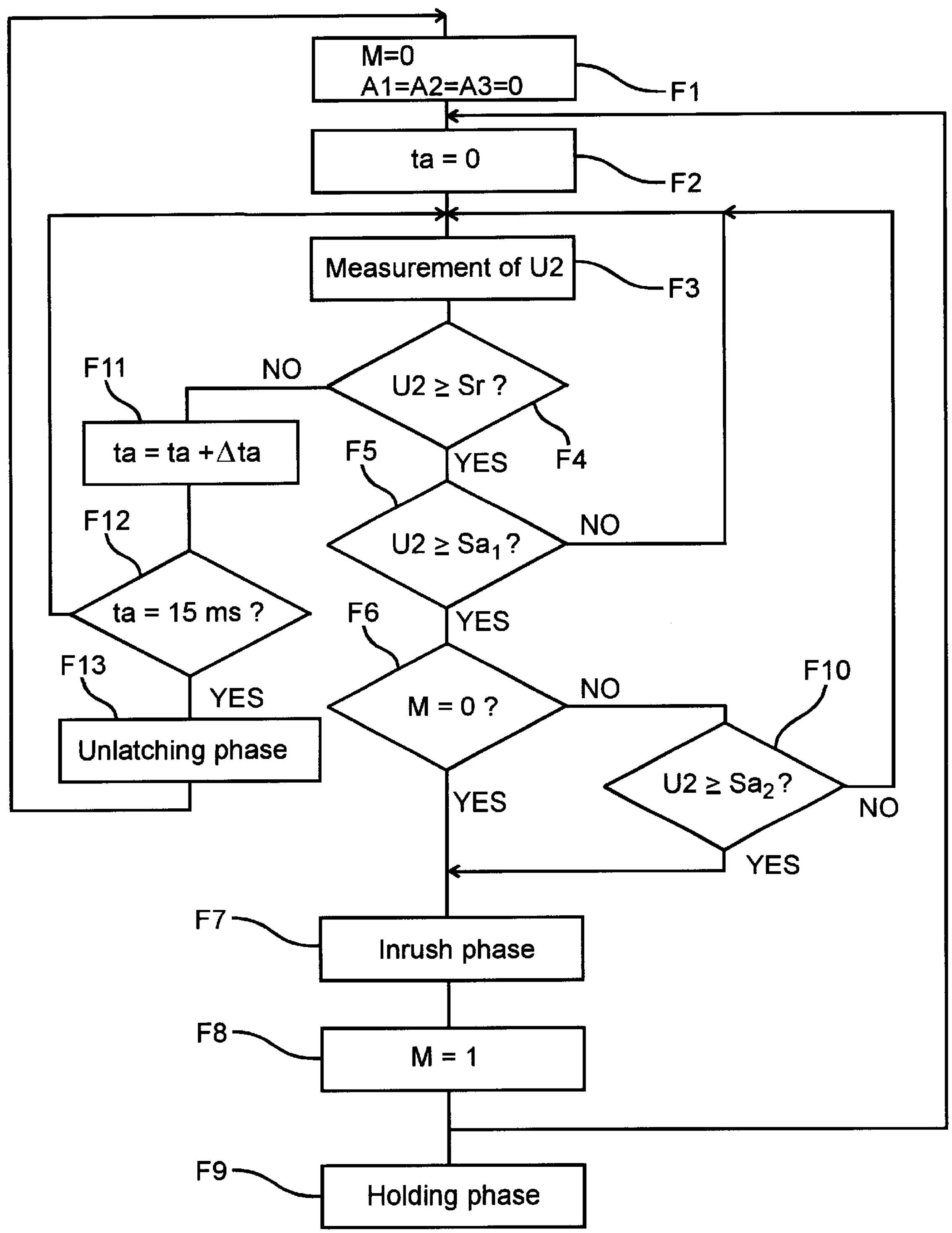
FIG. 5 represents a particular embodiment of a flowchart of operation of a device according to the invention.

In an initialization step F1, an indicator M is set to a first logic state, 0 in FIG. 5. Then in a step F2 a time indicator ta is set to 0. Then the microprocessor of the control circuit 14 goes on to a step F3 of measurement (sampling and conversion) of the voltage U2 applied to the input E1.

The microprocessor then goes on to a step F4 of comparing the voltage U2 with the drop-out threshold Sr. If the voltage U2 is greater than or equal to the threshold Sr (YES output of F4), then, in a step F5, the voltage U2 is compared with a first inrush threshold $Sa_1$. If the voltage U2 is lower than the threshold $Sa_1$ (NO output of F5), the microprocessor goes back to the input of the step F3 of measurement of U2 for monitoring of a new voltage sample. This corresponds, in FIG. 7*a*, to the moments prior to the time t1. If on the other hand, at F5, the voltage U2 is greater than or equal to the threshold $Sa_1$ (YES output of F5), the microprocessor goes on to a step F6 in which it checks if the indicator M is still at zero. If this is the case (YES output of F6), the microprocessor goes on to a step F7 corresponding to an inrush phase.

The transistor T1, or T2 in the embodiment with double coil of FIG. 4, is then controlled by the control circuit 14 so that a current Ib whose value is equal to a setpoint value Ica flows in the coil 2, or in the inrush coil 16 in the case of a double coil, during the inrush phase. In FIG. 7*b* this phase ends at a time t2. The duration of the inrush phase is preset, for example 80 ms, so as to ensure in all cases correct contact of the fixed and movable cores of the electromagnet. At the end of the inrush phase, in a step F8, the indicator M is set to logic state 1, then the microprocessor goes on to a step F9 corresponding to a holding phase. During the holding phase, the transistor T1 is controlled so that the coil 6 has flowing through it a current Ib whose value is equal to a setpoint value Icm (FIG. 7*b*), lower than Ica, sufficient to keep the cores of the electromagnet into contact.

During the holding phase the microprocessor continues monitoring the voltage U2 by going back, in parallel with going to step F9, to the input of step F2.

If, at the step F6, the indicator M is not zero (NO output of F6), this means that the electromagnet is in a holding phase. The microprocessor then checks, in a step F10, if the voltage U2 is equal to or greater than a second inrush threshold $Sa_2$. If this is not the case (NO output of F10), this therefore means that the voltage U2 is comprised between the thresholds $Sa_1$ and $Sa_2$ and that the coil has the holding current flowing through it. This state corresponds to the state represented between the times t2 and t3 in FIGS. 7*a* and 7*b*. The microprocessor then goes back to the input of step F3, continuing monitoring of U2. If on the other hand, at the step F10, U2 is greater than or equal to $Sa_2$ (YES output of F10), the microprocessor then goes to the step F7 causing a new inrush phase between the times t3 and t4, then to a holding phase after the time t4.

If, at the step F4, the voltage U2 is lower than the drop-out threshold Sr (NO output of F4), the indicator ta is incremented (ta=ta+Δta) in a step F11. Then, in a step F12, ta is compared with a preset time, 15 ms in FIG. 5. If the time indicator ta is not equal to 15 ms (NO output of F12), the microprocessor goes back to the input of the step F3. If on the other hand ta is equal to 15 ms (YES output of F12), this means that the voltage U2 has been lower than the drop-out threshold for 15 ms. The microprocessor then causes (step F13) switching to an unlatching phase, during which the current flowing in the coil, or in the coils in the case of a double coil, is annulled. The drop-out threshold Sr and the maximum time ta are chosen so that the electronic control circuit gives an unlatching order before the electromagnet drops by itself.

In a preferred embodiment, the first inrush threshold, $Sa_1$, is representative of a voltage comprised between 40 and 50%, preferably 45%, of the rated supply voltage of the electromagnet and the second inrush threshold, $Sa_2$, is representative of a voltage comprised between 70 and 85%, preferably 80%, of the rated supply voltage of the electromagnet. The drop-out threshold Sr for its part corresponds to a voltage of about 30% of the rated supply voltage.

Figure 7A:
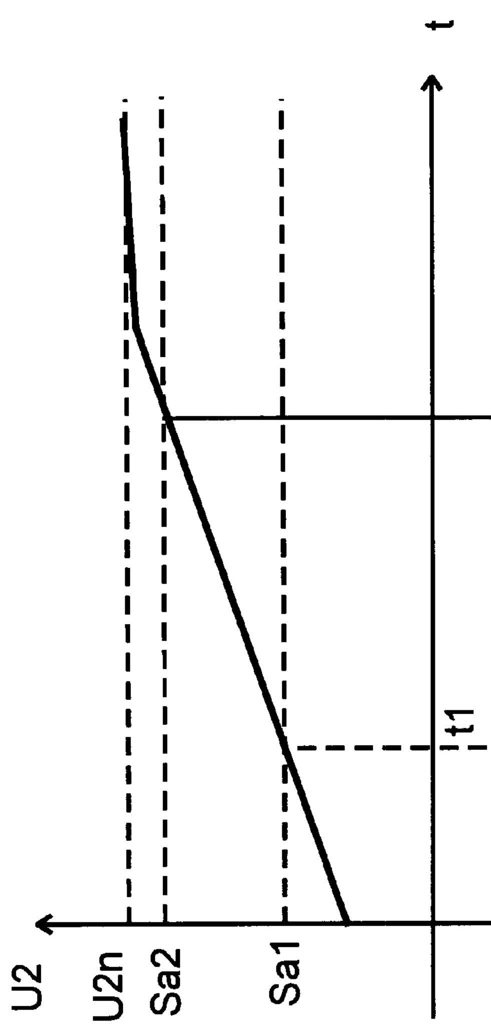
FIGS. 7*a* and 7*b* respectively illustrate the variations, versus time, of the signals U2 and Ib in a device according to FIG. 3, when the voltage U2 increases slowly.
Figure 7B:
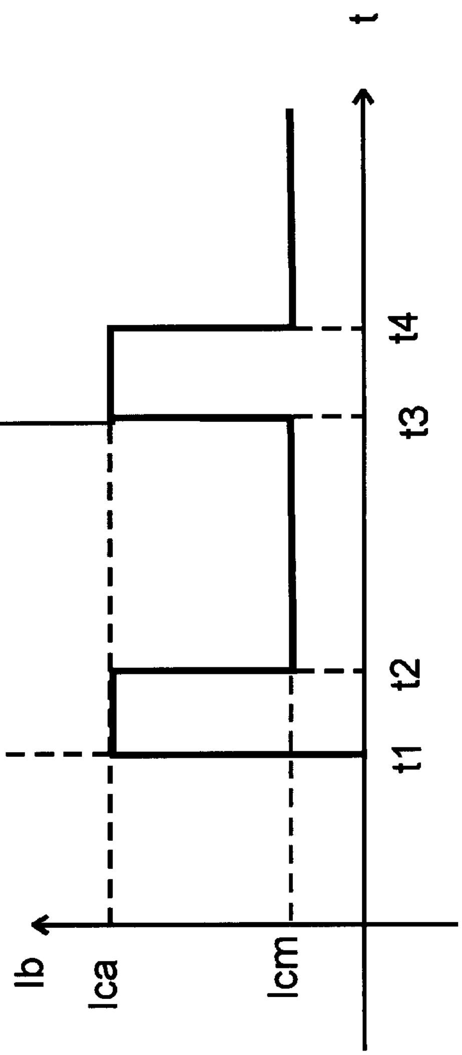

In the case of a slow increase of the supply voltage, as represented in FIG. 7*a*, when the voltage U2 reaches the first threshold $Sa_1$, at the time t1, switching to inrush phase (t1–t2) automatically brings into contact the cores of an electromagnet with a weak spring, i.e. of the type used for a shunt release (MX) or for a closing electromagnet (XF). If on the other hand the electromagnet, with a powerful spring, is of the type used for an under-voltage release (MN), this inrush phase is insufficient. When the voltage U2 reaches the second threshold $Sa_2$, at the time t3, the control circuit causes a new switching to inrush phase (t3–t4). This new inrush phase does not have any influence if the cores of the electromagnet were already brought into contact during the first inrush phase. If on the other hand this was not the case, then the cores come into contact during this second inrush phase. In the case of a fast increase of the supply voltage, the first inrush phase may be sufficient in all cases.

To increase the reliability of the control device, the latter preferably also comprises means for detecting micro-breaks of the supply voltage Ua. Such a micro-break, or transient voltage interruption, may in fact make the electromagnet drop out when the latter is in holding phase. As described above, an unlatching phase is only introduced by the microprocessor if the voltage U2 remains lower than the drop-out threshold Sr for at least 15 ms. A shorter break, for example 10–11 ms, must not lead to switching to an unlatching phase. However, to prevent a possible unscheduled unlatching of the electromagnet, the control circuit 14 which detects such a micro-break switches to a new inrush phase.

Figure 6:
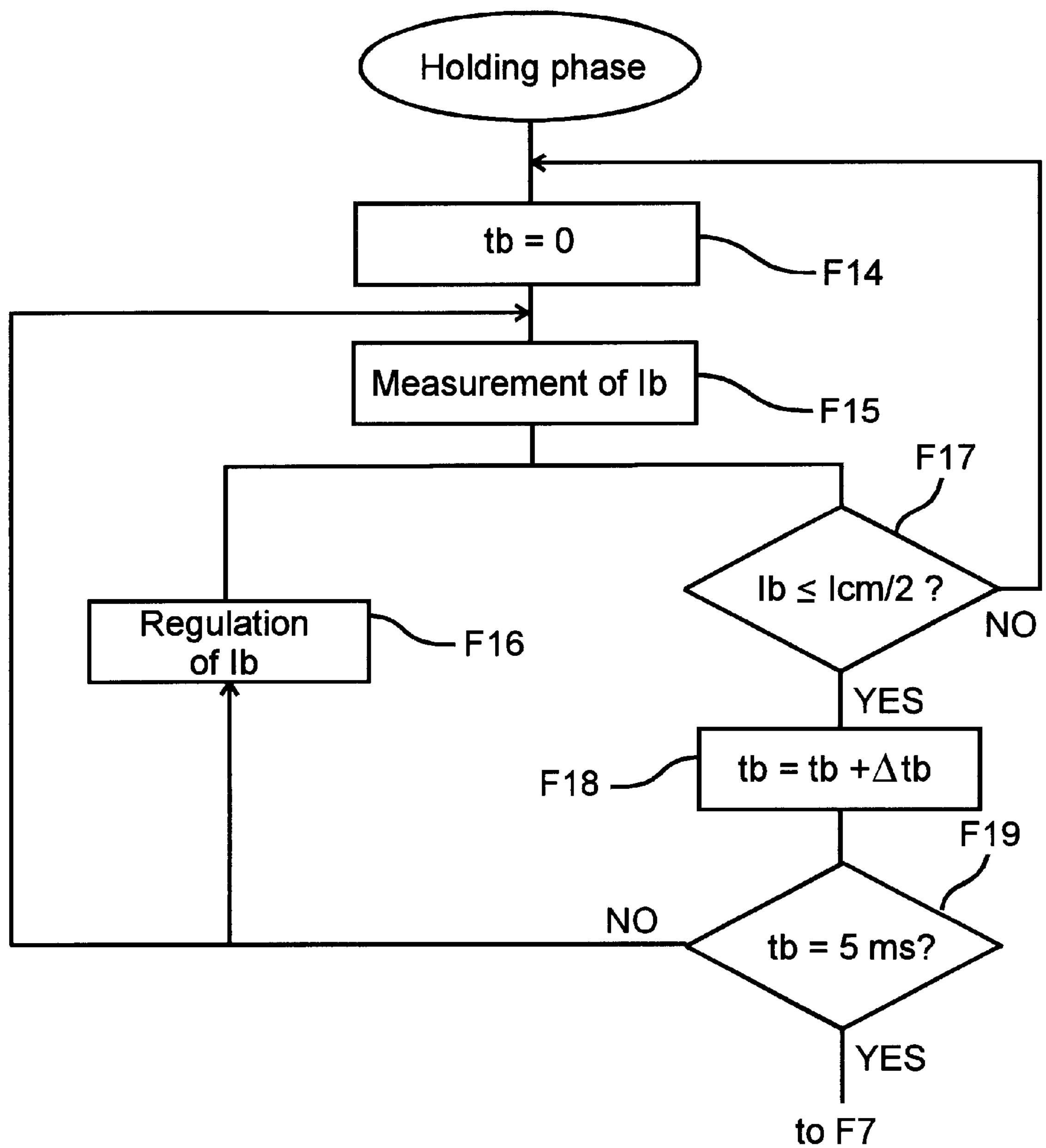
FIG. 6 illustrates a particular embodiment of a sub-routine corresponding to a holding phase of the flowchart according to FIG. 5.
Figures 8A, 8B:
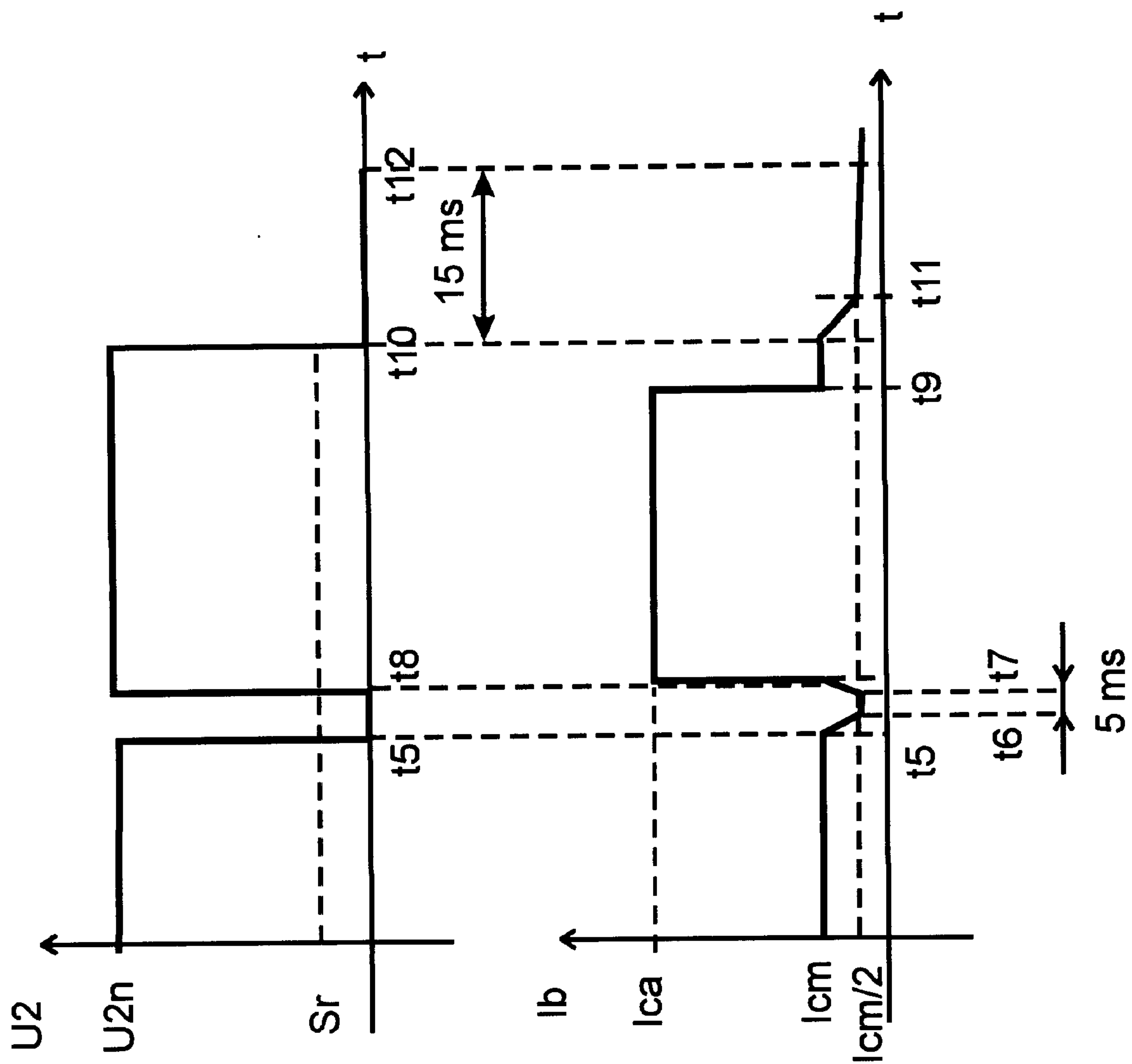
FIGS. 8*a* and 8*b* respectively illustrate the variations, versus time, of the signals U2 and Ib in a device according to FIG. 3 in case of a micro-break and in case of a supply voltage drop.

In the particular embodiment illustrated in FIGS. 6, 8*a* and 8*b*, detection of a micro-break during a holding phase is based on monitoring of the holding current Ib in the coil 2. When the current Ib is lower than a preset function, preferably comprised between ¼ and ½, of the setpoint value Icm during a preset period, preferably about a few milliseconds, a new inrush phase is caused.

In the sub-routine of FIG. 6, a holding phase begins with an initialization step F14, during which a time indicator tb is set to zero. Then, in a step F15, the current Ib is measured. For this, the transistor T1 is temporarily turned on, enabling sampling and analog-to-digital conversion of the signals applied to the input E2 of the control circuit 14. Then the microprocessor performs in parallel detection of micro-breaks and regulation of the current Ib to the setpoint value Icm, in a step F16 which loops back on the input of step F15. To detect micro-breaks, the microprocessor compares the current Ib with a threshold equal to Icm/2 (or Icm/4) in a step F17. If (NO output of F17) the current Ib is greater than this threshold (before the time t5 in FIG. 8*b*), the microprocessor then goes back to the input of step F14. If on the other hand (between t6 and t7) the current Ib is lower than or equal to this threshold, then the microprocessor goes (YES output of F17) to a step F18 during which the time indicator tb is incremented (tb=tb+Δtb). Then in a step F19, the time indicator tb is compared to 5 ms. If tb is lower than 5 ms (NO output of F19), then the microprocessor loops back on the input of step F15 for a new measurement of Ib. On the other hand if tb=5 ms (YES output of F19) this means that the current Ib has been lower than the threshold Icm/2 for 5 ms and the microprocessor causes a new inrush phase (step 7), at the time t7. If a micro-break was really involved, the voltage U2 has already returned to its rated voltage or returns thereto at the beginning of the inrush phase, at a time t8, and the current can take the value Ica during the time the inrush phase lasts, before a new switching to holding phase at a time t9. If on the other hand, as represented in FIG. 8*a*, the voltage drop starting at a time t10 lasts for more than 15 ms, this voltage drop first causes a current drop, which is detected 5 ms later, at t11, as a micro-break causing switching to an inrush phase. However, as the voltage is not re-established, the current Ib continues to drop and keeping the voltage U2 below the drop-out threshold Sr for at least 15 ms (FIG. 8*a*) leads the microprocessor to cause an unlatching phase at the time t12 (step F13 of FIG. 5) during which the current in the coil is annulled. Measurement of the voltage U2 by the control circuit 14 must have a satisfactory precision whether the supply voltage Ua, from which it is derived, is a DC voltage or a full-wave rectified AC voltage as in the embodiment of FIG. 3. Moreover, in the case of a rectified AC voltage, the frequency of the AC voltage must be able to vary in frequency ranges comprised between 45 and 65 Hz and 360 and 440 Hz. In the case of a circuit breaker, the voltage can be disturbed by harmonics and measurement must be fast because with opening electromagnets the circuit breaker must open in less than 40 milliseconds. In addition, the required operating temperature ranges from −40° C. to +125° C.

In known circuit breaker opening and closing electromagnets, voltage measurement is generally performed by means of a low-pass analog filter. This filter supplies a mean value of the voltage to be measured with a poor precision (more than 10% in general) and requires the use of a very precise, very stable in temperature capacitor, which is expensive and voluminous.

To overcome these drawbacks, measurement of the voltage is preferably achieved by numerical electronic processing supplying a rms value of the voltage U2 by means of a finite impulse response (FIR) filter. In a preferred embodiment, the voltage U2 is sampled with a sampling period Tc=625 μs. Preferably, a new computation is performed every 8 samples, i.e. every 5 milliseconds. The microprocessor uses 24 samples for each computation.

Figure 9:
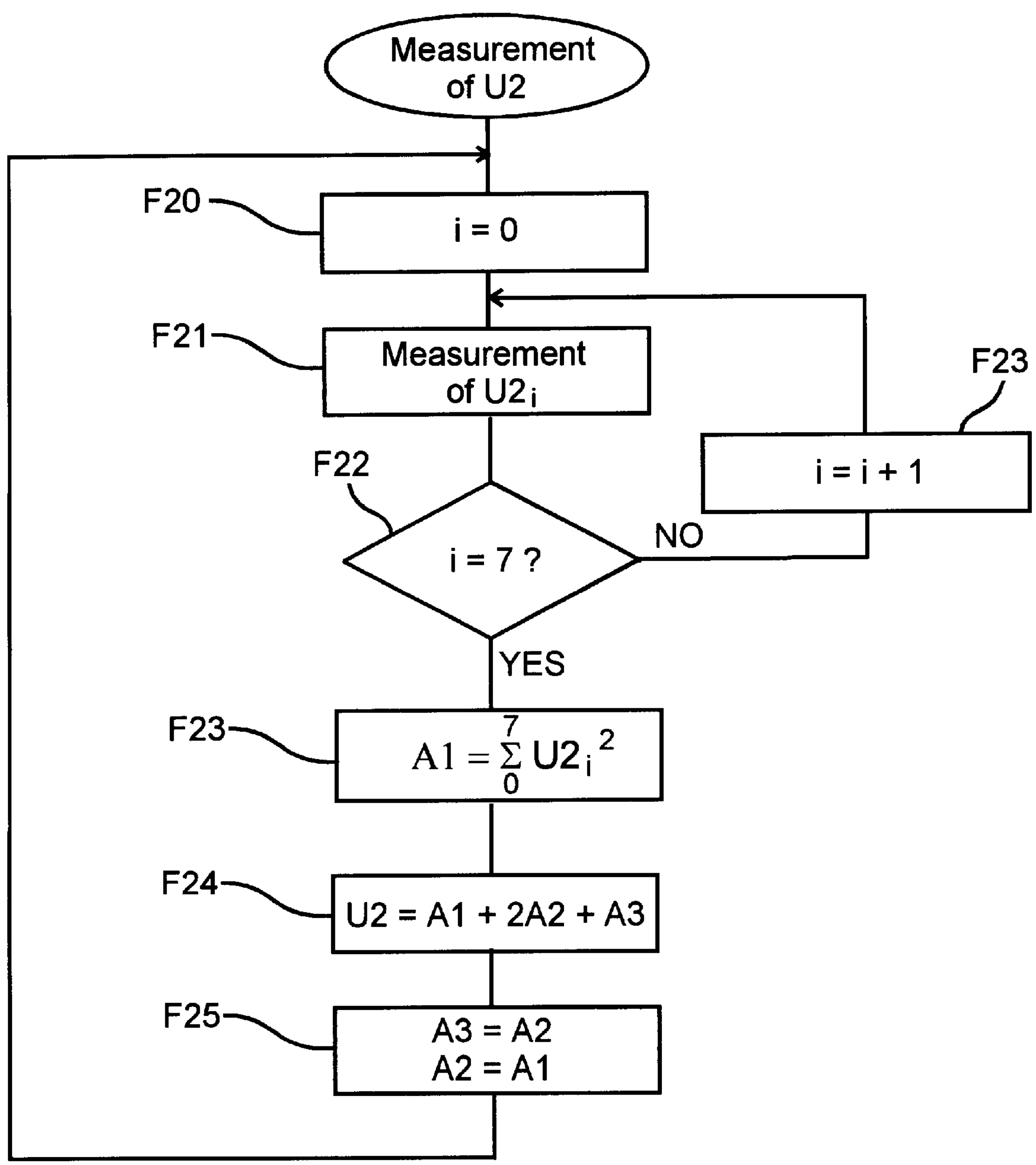
FIG. 9 represents a particular embodiment of a sub-routine for measuring the voltage U2.

In the particular embodiment illustrated in FIG. 9, measurement of U2 starts with an initialization step F20, during which an indicator i is set to 0. Then the microprocessor of the control circuit 14 goes on to a step F21 of measuring and storing a sample $U2_i$. It then checks, in a step F22, if the indicator i has reached the value 7. If this is not the case (NO output of F22) it goes on to a step F23 of incrementing i (i=i+1) before looping back on the input of step F21 for measurement of a new voltage sample. If, at the step F22, i=7, this means that 8 successive samples of U2 have been stored. In this case (YES output of F22), the microprocessor goes on to a step F23 of computation of a first partial sum A1 of the square of the last 8 measured samples $$\left(A1 = \sum_{0}^{7} U2_i^2\right).$$

Then, in a step F24, the microprocessor computes a value of U2 obtained by the weighted sum of three successive partial sums A1, A2 and A3 (U2=A1+2A2+A3). It should be noted that initially the sums A1, A2 and A3 had been set to zero during the step F1 (FIG. 5). In a step F25 the new partial sum A3 takes the value of A2 and the new partial sum A2 takes the value of A1. The microprocessor then loops back to the input of step F20, enabling, after 8 new samples have been measured, a new computation of U2 to be performed taking the last 24 samples measured into account.

The value of U2 thus obtained is representative of its rms value, measured numerically by means of a finite impulse response filter having an equation of the type:

$$U2 = a_1A1 + a_2A2 + \cdots + a_jA_j + \cdots + a_nAn$$

$$\text{with } Aj = \sum_{0}^{m-1} U2_i^2$$

in which the weighting coefficients $a_j$ are different, and where n≧2 and m≧1. The rms value of the voltage U2 is thus computed from the weighted sum of n partial sums of m squares of samples $U2_i$.

In the preferred embodiment of FIG. 9, n=3, m=8, $a_1=a_3=1$ and $a_2=2$.

The FIR filter used may be of another type, the number of samples, weighting coefficients, and sampling frequency depending on the precision and speed required. For example, Hanning, Hamming, rectangular-shaped etc., windows can be used.

What is claimed is:

1. A control device of a circuit breaker for opening or closing an electromagnet, said device comprising:

at least one coil connected in series with an electronic switch to the terminals of a supply voltage, means for measuring a first voltage, representative of the supply voltage, and means for controlling the electromagnet, comprising means for comparing the first voltage with first and second inrush thresholds and a drop-out threshold, said means for comparing connected to the means for measuring the first voltage and to a control electrode of the electronic switch, and for monitoring the flow of an inrush current in the coil during an inrush phase of preset duration when the first voltage reaches one of the inrush thresholds.

2. The device according to claim 1, wherein the first and second inrush thresholds are representative of a voltage of about 40 to 50% and about 70 to 85%, respectively, of the rated supply voltage of the electromagnet.

3. The device according to claim 1, wherein the electromagnet is connected to an under-voltage release.

4. The device according to claim 1, wherein the electromagnet is connected to a shunt release.

5. The device according to claim 1, wherein, at the end of an inrush phase the control means is for controlling, during a holding phase, the flow in the coil of a holding current weaker than the inrush current, the device further comprising:

means for measuring the current flowing in the coil, wherein the control means comprises:
  means for measuring the first voltage comprising:
    means for regulating the holding current,
    means for comparing the current with a preset setpoint value, and
    means for controlling switching to a new inrush phase when, during a holding phase, the current is less than or equal to a preset fraction of the setpoint value during a second preset duration.

6. The device according to claim 5, wherein said fraction is between ¼ and ½ of the setpoint value.

7. The device according to claim 5, wherein the second preset duration is a few milliseconds.

8. The device according to claim 1, further comprising numerical means for determining the rms voltage comprising sampling means and a finite impulse response filter having an equation of the form:

$$U2 = a_1A1 + a_2A2 + \cdots + a_jA_j + \cdots + a_nAn$$

$$\text{with } Aj = \sum_{0}^{m-1} U2_i^2$$

where $U2_i$ is a sample of the first voltage, n≧2, m≧1, the weighting coefficients $a_j$ not all being identical.

9. The device according to claim 8, wherein n=3, $a_1=a_3=1$ and $a_2=2$.

10. The device according to claim 2, wherein m=8.

* * * * *